US009272920B2

(12) United States Patent
Carpenter et al.

(10) Patent No.: US 9,272,920 B2
(45) Date of Patent: Mar. 1, 2016

(54) SYSTEM AND METHOD FOR AMMONIA SYNTHESIS

(71) Applicant: QuantumSphere, Inc., Santa Ana, CA (US)

(72) Inventors: R. Douglas Carpenter, Tustin, CA (US); Kevin Maloney, Newport Beach, CA (US)

(73) Assignee: QuantumSphere, Inc., Santa Ana, CA (US)

( * ) Notice: Subject to any disclaimer, the term of this patent is extended or adjusted under 35 U.S.C. 154(b) by 1 day.

(21) Appl. No.: 14/085,500

(22) Filed: Nov. 20, 2013

(65) Prior Publication Data

US 2014/0072499 A1    Mar. 13, 2014

Related U.S. Application Data

(63) Continuation of application No. 13/585,640, filed on Aug. 14, 2012, now abandoned, which is a continuation of application No. 13/326,135, filed on Dec. 14, 2011, now abandoned, which is a continuation of application No. 13/050,823, filed on Mar. 17, 2011, now abandoned, which is a continuation of application No. 12/752,018, filed on Mar. 31, 2010, now abandoned, which is a continuation-in-part of application No. 12/418,356, filed on Apr. 3, 2009, now abandoned, which is a continuation-in-part of application No. 12/266,477, filed on Nov. 6, 2008, now abandoned.

(60) Provisional application No. 60/985,855, filed on Nov. 6, 2007.

(51) Int. Cl.
*C01C 1/04* (2006.01)
*B01J 23/745* (2006.01)
*B01J 35/00* (2006.01)
*B82Y 40/00* (2011.01)

(52) U.S. Cl.
CPC .............. *C01C 1/0411* (2013.01); *B01J 23/745* (2013.01); *B01J 35/0013* (2013.01); *B82Y 40/00* (2013.01)

(58) Field of Classification Search
None
See application file for complete search history.

(56) References Cited

U.S. PATENT DOCUMENTS

| 3,653,831 A | 4/1972 | Burnett |
| 3,951,862 A | 4/1976 | Sze |
| 3,992,328 A | 11/1976 | Sze et al. |
| 4,163,775 A | 8/1979 | Foster et al. |
| 4,179,407 A | 12/1979 | Iiyama et al. |
| 4,235,749 A | 11/1980 | Gens |

(Continued)

FOREIGN PATENT DOCUMENTS

GB    2114461 A    8/1983

OTHER PUBLICATIONS

U.S. Appl. No. 12/266,477, filed Nov. 6, 2008, Carpenter.

(Continued)

*Primary Examiner* — Melissa Swain
(74) *Attorney, Agent, or Firm* — Knobbe Martens Olson & Bear LLP

(57) ABSTRACT

Systems and methods are disclosed herein for synthesizing ammonia using nano-size metal or metal alloy catalyst particles. Hydrogen and nitrogen gases are passed through a system comprising, for example, a bed of magnetite supporting nano-size iron or iron alloy catalyst particles having an optional oxide layer that forms the catalyst.

3 Claims, 2 Drawing Sheets

(56) References Cited

U.S. PATENT DOCUMENTS

| | | | |
|---|---|---|---|
| 4,623,532 | A | 11/1986 | Ozyagcilar et al. |
| 4,698,325 | A | 10/1987 | Andrew et al. |
| 4,789,657 | A | 12/1988 | Pernicone et al. |
| 4,822,586 | A | 4/1989 | Shannahan |
| 5,032,364 | A | 7/1991 | Pinto |
| 5,846,507 | A | 12/1998 | Liu et al. |
| 6,531,704 | B2 | 3/2003 | Yadav et al. |
| 6,716,525 | B1 | 4/2004 | Yadav et al. |
| 6,716,791 | B1 | 4/2004 | Fuglerud et al. |
| 7,078,130 | B2 | 7/2006 | Antonelli |
| 7,282,167 | B2 | 10/2007 | Carpenter |
| 2005/0103990 | A1 | 5/2005 | Pham-Huu et al. |
| 2006/0039847 | A1 | 2/2006 | Kaboord et al. |
| 2006/0070491 | A1 | 4/2006 | Yang et al. |
| 2006/0099131 | A1 | 5/2006 | Singh et al. |
| 2008/0161428 | A1 | 7/2008 | Strait |

OTHER PUBLICATIONS

U.S. Appl. No. 12/418,356, filed Apr. 3, 2009, Carpenter.
U.S. Appl. No. 12/752,018, filed Mar. 31, 2010, Carpenter et al.
International Search Report for International Application No. PCT/US2010/29508, dated Jun. 16, 2010, in 3 pages.
International Search Report for PCT/US 08/82682, dated Dec. 24, 2008.
Written Opinion of the International Searching Authority for International Application No. PCT/US2010/29508, Jun. 16, 2010, in 4 pages.
Xu et al., "Microwave-assisted synthesis of MgO-CNTs supported ruthenium catalysts for ammonia synthesis," 2007, Catalysis Communications, 8, pp. 1881-1885.
Wu et al., "Novel preparation of nanocrystalline magnesia-supported caesium-promoted ruthenium catalyst with high activity for ammonia synthesis," 2003, Chem. Commun., pp. 2488-2489.
Zheng et al., Translation of "Electrochemical Properties of SrCe095Y0.05O3-δ At Intermediate Temperature and Its Application to Ammonia Synthesis at Atmospheric Pressure," 2003, ACTA Chimica Sinica, pp. 505-509.
Su et al., Translation of "Electrochemical Properties of SrCe095Y0.05O3-δ At Intermediate Temperature and Its Application to Ammonia Synthesis at Atmospheric Pressure," 2003, ACTA Chimica Sinica, pp. 505-509.
Liu et al., "Catalyst preparation using plasma technologies," 2002, Catalysis Today. 72, pp. 173-184.
Jacobsen et al., "Catalyst Design by Interpolation in the Periodic Table: Bimetallic Ammonia Synthesis Catalysts," 2001, J. Am. Chem. Soc., 123, pp. 8404-8405.
Su et al., "Electrochemical Properties of SrCe095Y0.05O3-δ At Intermediate Temperature and Its Application to Ammonia Synthesis at Atmospheric Pressure," 2003, ACTA Chimica Sinica, pp. 505-509.
U.S. Appl. No. 13/050,823, filed Mar. 17, 2011, Carpenter et al.
U.S. Appl. No. 13/326,135, filed Dec. 14, 2011, Carpenter et al.
U.S. Appl. No. 13/585,640, filed Aug. 14, 2012, Carpenter et al.
Zheng et al., "The Second Generation Catalysis System for Ammonia Synthesis—Ruthenium-Based Ammonia Synthesis Catalyst and Its Industrial Application," 2001, Progress in Chemistry, vol. 13, pp. 472-478.
Song et al., "Structure and Reactivity of Ru Nanoparticles Supported on Modified Graphite Surfaces: A Study of the Model Catalysts for Ammonia Synthesis," 2004, J. Am. Chem. Soc., 126, pp. 8576-8584.
Somorjai et al., "Colloid Science of Metal Nanoparticle Catalysts in 2D and 3D Structure. Challenges of Nucleation, Growth, Composition, Particle Shape, Size Control and Their Influence on Activity and Selectivity," 2008, Top Catal, 49, pp. 126-135.
Hu et al., "Magnetically Recoverable Chiral Catalysts Immobilized on Magnetite Nanoparticles for Asymmetric Hydrogenation of Aromatic Ketones," 2005, J. Am. Chem. Soc., 127, pp. 12486-12487.
Ding et al., "Magnetic Naoparticle Supported Catalyst for Atom Transfer Radical Polymerization," 2006, Macromolecules, 39 pp. 6399-6405.
Ge et al., "Hierarchal Magnetite/Silica Nanoassemblies as Magneticallly Recoverable Catalyst-Supports," 2008, Nano Letters, vol. 8, No. 3, pp. 931-934.
Lytken et al., "Ammonia synthesis on Au modified Fe(1 1 1) and Ag and Cu modified Fe(1 0 0) surfaces," 2003, Surface Science, 543, pp. 207-218.

SYSTEM AND METHOD FOR AMMONIA SYNTHESIS

RELATED APPLICATIONS

This application is a continuation of U.S. patent application Ser. No. 13/585,640, filed Aug. 14, 2012, which is a continuation of U.S. patent application Ser. No. 13/326,135, filed Dec. 14, 2011, which is a continuation of U.S. patent application Ser. No. 13/050,823, filed Mar. 17, 2011, which is a continuation of U.S. patent application Ser. No. 12/752,018, filed Mar. 31, 2010, which is a continuation-in-part of U.S. patent application Ser. No. 12/418,356, filed Apr. 3, 2009, which is a continuation-in-part of U.S. patent application Ser. No. 12/266,477, filed on Nov. 6, 2008, which claims the benefit of Provisional Application No. 60/985,855, filed on Nov. 6, 2007, the entire contents of each of which are hereby incorporated by this express reference.

BACKGROUND

1. Technical Field

The disclosure relates generally to the synthesis of useful chemical byproducts and, more specifically, to the synthesis of ammonia using nano-size metal catalyst particles.

2. Related Art

Ammonia synthesis is an important industrial process. Ammonia is produced in huge quantities worldwide, for use in the fertilizer industry, as a precursor for nitric acid and nitrates for the explosives industry, and as a raw material for various industrial chemicals.

Despite an energy production cost of about 35 to 50 GJ per ton of ammonia, the Haber-Bosch process is the most widespread ammonia manufacturing process used today. The Haber-Bosch process was invented in the early 1900s in Germany and is fundamental to modern chemical engineering.

The Haber-Bosch process uses an iron catalyst to improve $NH_3$ yields. Being a transition metal with partially occupied d-bands, iron represents a surface suitable for adsorption and dissociation of $N_2$ molecules. An example of a commonly used iron catalyst is reduced magnetite ore ($Fe_3O_4$) enriched ("promoted") with oxides of, for example, aluminum, potassium, calcium, magnesium, or silicon.

In the Haber-Bosch process, ammonia is synthesized using hydrogen ($H_2$) and nitrogen ($N_2$) gases according to the net reaction ($N_2 + 3H_2 \rightarrow 2NH_3$). The mechanism for iron-catalyzed ammonia synthesis is stated below in four dominant reaction steps, wherein "ads" denotes a species adsorbed on the iron catalyst and "g" denotes a gas phase species:

$$N_2(ads) \rightarrow 2N(ads) \quad (1)$$

$$H_2(ads) \rightarrow 2H(ads) \quad (2)$$

$$N(ads) + 3H(ads) \rightarrow NH_3(ads) \quad (3)$$

$$NH_3(ads) \rightarrow NH_3(g) \quad (4)$$

The rate limiting step in the conversion of nitrogen and hydrogen into ammonia has been determined to be the adsorption and dissociation of the nitrogen on the catalyst surface. Thermodynamic equilibrium of the reaction is shifted towards ammonia product by high pressure and low temperature. However, in practice, both high pressures and temperatures are used due to a sluggish reaction rate. Due to overall low reaction efficiency when hydrogen and nitrogen are first passed over the catalyst bed, most ammonia production plants utilize multiple adiabatically heated catalyst beds with cooling between beds, typically with axial or radial flow. High pressure favors the adsorption process as well, but at a cost of increased operational and capital costs.

At pressures above 750 atm, there is an almost 100% conversion of reactants to the ammonia product. Because there are difficulties associated with containing larger amounts of materials at this high pressure, lower pressures of about 150 to 250 atm are used industrially. By using a pressure of around 200 atm and a temperature of about 500° C., the yield of ammonia is about 10 to 20%, while costs and safety concerns in the plant and during operation of the plant are minimized. Nevertheless, due in part to high pressures used in the process, ammonia production requires reactors with heavily-reinforced walls, piping and fittings, as well as a series of powerful compressors, all with high capital cost. In addition, generation of those high pressures during plant operation requires a large expenditure in energy.

In an effort to reduce the energy requirements of this process, the Kellogg Advanced Ammonia Process (KAAP) was developed using a ruthenium catalyst supported on carbon. The KAAP catalyst is reported to be 40% more active than the traditional iron catalysts. Use of this catalyst allowed the reactor pressure to be reduced, but the high cost of the precious metal ruthenium catalyst and the sensitivity of the catalyst to impurities in the hydrogen feed stock have prevented widespread use for ammonia synthesis. Other catalysts being studied include cobalt doped with ruthenium, but few encouraging results have been exhibited to date. Thus, after almost 90 years of ammonia synthesis, the Haber-Bosch process remains the most commonly used ammonia synthesis mechanism.

For the last 100 years, iron-based catalysts have been used in industrial ammonia synthesis. This catalyst is prepared by melting magnetite ($Fe_3O_4$) with a promoter compounds, for example potassium or calcium, and solidifying. The resulting porous material is then crushed into granules, generally in the size range of 1-10 millimeters. Active catalyst is then produced by reduction of iron oxides with hydrogen and nitrogen gas mixture, to give porous iron, and unreduced promoter oxides. Approximately 50% of this catalyst is void volume.

Improvements to Haber-Bosch catalysts focus on the addition of promoters for improved activity ammonia synthesis. U.S. Pat. Nos. 4,789,657 and 3,951,862 describe processes of preparing a magnetite-based ammonia synthesis catalyst via the melting of iron oxide with other compounds, such as $Al_2O_3$, $K_2O$, CaO, MgO, and $SiO_2$, and grinding into granules. U.S. Pat. No. 5,846,507 describes an iron composition having a non-stoichiometric oxide content and additional promoters, prepared by melting. Suggestions of reducing the processing pressures have been made, but have not been achieved economically.

Non-ferrous metal oxides may also be incorporated into the granules. For example, U.S. Pat. No. 6,716,791 describes the addition of cobalt and titanium oxides in a 0.1-3.0% weight ratio as additional promoters to aluminum, potassium, calcium, and magnesium. U.S. Pat. No. 3,653,831 describes the addition of platinum to improve reaction efficiency, however given the expense of platinum this may not be feasible at large scales. Other promoters, such as cerium described in U.S. Pat. No. 3,992,328 have also been shown to increase activity. Other improvements include alternative catalysts, such as those described in U.S. Pat. Nos. 4,163,775 and 4,179,407. These supported catalysts include ruthenium, rhodium, lanthanides and alloys.

Ideally, highly active ammonia catalysts can be used without significant changes to the many existing ammonia plants that exist today; the best candidates would be a "drop in"

solution for existing manufacturers. Retrofit and reconstruction of these plants could be costly should there be a need to change design based on catalyst properties, such as space velocity. The best candidate catalyst would exhibit increased activity, have similar basic properties as compared to existing catalysts, and reduce operating costs. Non-ferrous catalysts in the above referenced prior art do not overcome all of these constraints because 1) catalyst cost increases more than catalyst efficiency, 2) the catalyst may not have the same properties that allow for seamless operation in existing ammonia production plants, or 3) the catalyst may have high activity but do not meet long term durability requirements.

SUMMARY

The invention described herein comprises the synthesis of ammonia by providing core-shell iron/iron oxide nanoparticles on ferrous catalysts to improve catalytic activity while maintaining durability. In various embodiments herein, systems and methods for the synthesis of ammonia are disclosed that are capable of being used in both traditional and new ammonia reactor bed designs. The function of the nano-size catalyst particles is improved by dispersing or separating the particles using a support material, thereby reducing or eliminating sintering of adjacent particles. The result are systems and methods that can operate at much lower pressures than the Haber-Bosch process and that can maintain catalysis efficiency over time.

In at least one embodiment of the present invention, methods of synthesizing ammonia are provided comprising reacting a supply of nitrogen gas and hydrogen gas in the presence of nano-sized metal catalyst particles disposed on a support material that is configured to disperse the catalyst particles, wherein the reaction proceeds at a pressure less than about 500 atm., preferably less than about 200 atm., and more preferably less than about 100 atm.

In certain embodiments and applications, the reaction proceeds cost effectively at pressures less than about 10 atm. In certain embodiments of the inventive methods, at least a portion of the nano-sized metal catalyst particles are selected from the group consisting of iron, cobalt, ruthenium, alloys thereof, and mixtures thereof. In certain embodiments, at least a portion of the nano-sized metal catalyst particles comprise a metal core and an oxide shell. In certain embodiments, the support material comprises a porous structure. In certain embodiments, the support material comprises a matrix, tubes, granules, a honeycomb, or the like. In certain embodiments, the support material comprises magnetite or other ferrous materials, silicon nitride, silicon carbide, silicon dioxide, aluminum oxide, and/or cordierite, as examples. In certain embodiments, the support material is configured to separate the catalyst nano-particles. In certain embodiments, the support material further comprises promoter molecules located adjacent the surface of the nano-sized metal catalyst particles. In certain embodiments, at least a portion of the promoter molecules comprise one or more of the elements selected from the group consisting of Groups 1, 2, 6, 9, 13, 14 and the lanthanide series on the periodic table, including but not limited to aluminum, potassium, calcium, magnesium, and/or silicon. It should also be recognized that oxides, including core-shell oxides, of promoter material are also contemplated for promoting ammonia synthesis. In one embodiment, at least some portion of the promoter comprises nano-scale material to further enhance interaction between the promoter particle and the nano-catalyst. Preferably, the promoter particle size is about 100 nanometers or smaller, although large nanoscale particles are also suitable for enhanced promotion.

In certain embodiments, the nanosized metal catalyst particles are disposed in a bed, with or without the support material.

In at least one embodiment of the present invention, an ammonia synthesis reactor is provided, with nano-sized metal catalyst particles disposed within the reactor, wherein the catalyst particles may be disposed on a support material that is configured to disperse the catalyst particles. In certain embodiments of the reactor, at least a portion of the nano-sized metal catalyst particles are selected from the group consisting of iron, cobalt, ruthenium, alloys thereof, and mixtures thereof. In certain embodiments, at least a portion of the nano-sized metal catalyst particles comprise a metal core and an oxide shell. In certain embodiments, the support material comprises a porous structure. In certain embodiments, the support material comprises a matrix, tubes, granules, a honeycomb, or the like. In certain embodiments, the support material comprises magnetite or other ferrous materials, silicon nitride, silicon carbide, silicon dioxide, aluminum oxide, or cordierite, by way of example. In certain embodiments, the support material is configured to separate the catalyst particles.

The reactor further comprises at least one inlet for providing hydrogen gas and nitrogen gas to the nano-sized metal catalyst particles and at least one outlet for removing ammonia gas generated in the presence of the nano-sized metal catalyst particles. The reactor is configured to operate at a pressure less than about 500 atm., preferably less than about 200 atm., and more preferably less than about 100 atm. In certain embodiments, the reactor is a plug flow reactor, a packed bed reactor, an adiabatic reactor, or an isothermal reactor. In certain embodiments, the nano-sized metal catalyst particles are disposed in a packed bed within the reactor. In certain embodiments, the support material further comprises promoter molecules located adjacent the surface of the nano-sized metal catalyst particles. In certain embodiments, at least a portion of the promoter molecules are selected from the group consisting of aluminum, potassium, calcium, magnesium, and silicon.

In at least one embodiment of the present invention, a $NO_x$ remediation system is provided that comprises a hydrogen gas supply and a nitrogen gas supply. The system further comprises a reactor in fluid communication with the hydrogen gas supply and the nitrogen gas supply comprising nano-sized metal catalyst particles, wherein the nano-sized metal catalyst particles are disposed on a support material that is configured to disperse the catalyst particles, and wherein the reactor is configured to generate ammonia gas at a pressure less than about 500 atm., preferably less than about 200 atm., and more preferably less than about 100 atm. The system further comprises an exhaust supply configured to provide a gas stream comprising $NO_x$ emissions and a selective catalytic reduction (SCR) system in fluid communication with the reactor and the exhaust supply, wherein the SCR system is configured to facilitate the reaction of the ammonia gas and the $NO_x$ emissions.

The features mentioned above in the summary, along with other features of the inventions disclosed herein, are described below with reference to the drawings. The illustrated embodiments in the figures listed below are intended to illustrate, but not to limit, the inventions.

DETAILED DESCRIPTION

Figure 1:
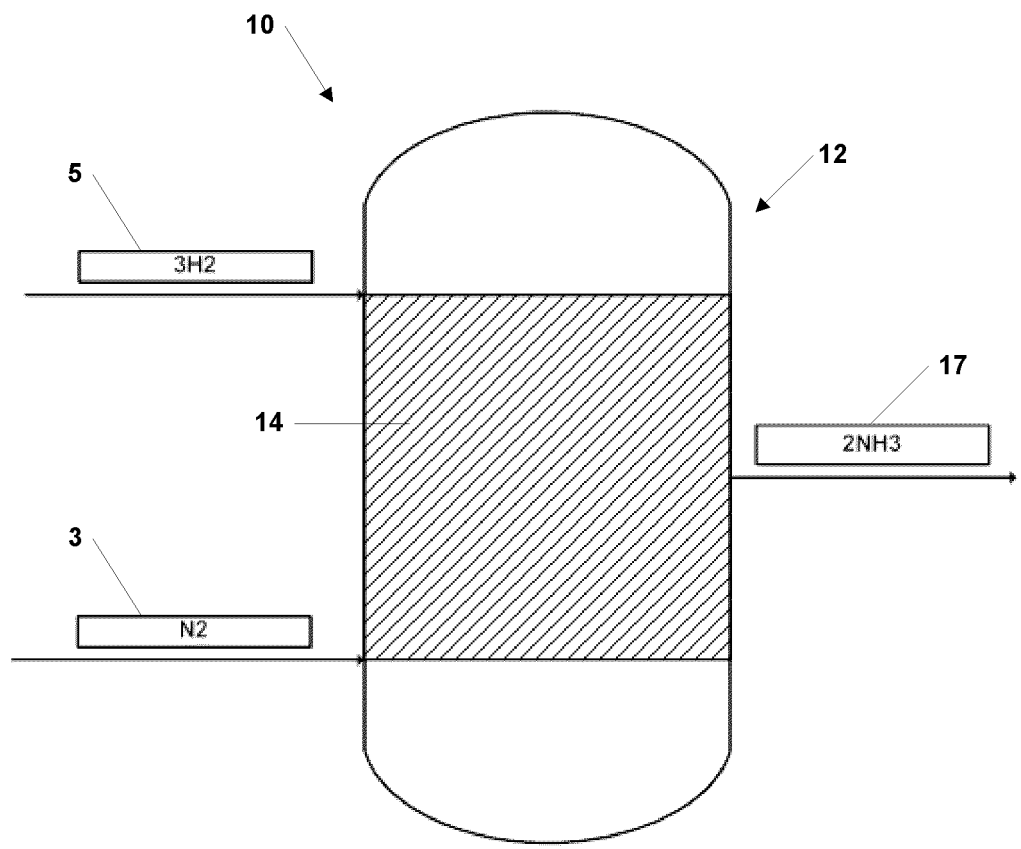
FIG. 1 is a schematic of a reactor comprising a bed of nano-sized metal catalyst particles.

In various embodiments, systems and methods of ammonia production are provided. Referring first FIG. 1, an example system 10 is shown comprising at least one reactor 12. In preferred embodiments, the reactor 12 comprises a plug flow reactor. One or more alternative reactors can be used instead of or in conjunction with a plug flow reactor, for example, packed bed, adiabatic, and/or iso-thermal reactors. As an example, one or more reactors can be connected in series.

$N_2$ gas 3 and $H_2$ gas 5 are introduced into the at least one reactor 12. The gases pass through a bed 14 of supported nano-sized metal catalyst particles disposed within the at least one reactor 12. A stream of $NH_3$ gas 17 exits the at least one reactor 12. In certain embodiments, the stream of $NH_3$ gas 17 can be collected in a reservoir of water (not shown) after suitable cooling, to take advantage of the extensive solubility of ammonia in water.

In certain embodiments, the supported nano-sized metal catalyst particles are disposed on the walls of the at least one reactor 12. In certain embodiments, the supported nano-sized metal catalyst particles are disposed within or on channels in the reactor 12. In certain embodiments, the supported nano-sized metal catalyst particles are piled in a packed bed configuration within the reactor. Alternative configurations for arranging the supported particles within the at least one reactor 12 can also be used. As used herein, "bed" 14 is used to refer to any suitable arrangement of supported nano-sized metal catalyst particles within the at least one reactor 12 and is not intended to be limited to a packed bed configuration.

The $N_2$ gas 3 and $H_2$ gas 5 are introduced into the at least one reactor 12 at a pressure below about 200 atm, preferably below about 100 atm, and more preferably between about 1 atm and 20 atm (e.g., between about 3 and 10 atm). Additional examples of pressures which have been demonstrated to be suitable for ammonia synthesis are about 4 atm and about 7 atm. In certain embodiments, the gases are heated to temperatures between about 200° C. and 600° C., and preferably between about 400° C. and 450° C. In certain embodiments, the gases 3, 5 are heated before entering the bed 14. In certain embodiments, the gases are heated inside the bed 14. In certain embodiments, the molar ratio of $N_2$ gas 3 to $H_2$ gas 5 introduced into the reactor 12 is about 1:10, 1:5, 1:2, or 1:1. Preferably, the molar ratio of $N_2$ gas 3 to $H_2$ gas 5 is about 1:3.

In certain embodiments, the $N_2$ gas 3 can be removed from compressed air using an oxygen exclusion membrane. It is desirable to remove oxygen gas from the $N_2$ gas 3 feed because oxygen can reduce the efficiency of the reactions described above (e.g., by a side reaction to form water). In certain embodiments, the $H_2$ gas 5 can be obtained from reformed natural gas. In preferred embodiments, the $H_2$ gas 5 is provided by electrolysis of water.

Figure 2:
FIG. 2 is an SEM of nano-sized ferrous catalyst particles with an oxide layer.

Nano-sized metal catalyst particles as used herein refer to metal nanoparticles, metal alloy nanoparticles, nanoparticles having a metal or metal alloy core and an oxide shell, or mixtures thereof. The particles are preferably generally spherical, as shown in FIG. 2. Preferably the individual nanoparticles have a diameter less than about 50 nm, more preferably between about 15 and 25 nm, and most preferably between about 1 and 15 nm. These particles can be produced by vapor condensation in a vacuum chamber. A preferable vapor condensation process yielding highly uniform metal nanoparticles is described in U.S. Pat. No. 7,282,167 to Carpenter, which is hereby expressly incorporated by reference in its entirety.

The nano-sized metal catalyst particles are disposed on a support material configured to disperse or separate the particles. It was surprisingly discovered that a reactor 12 comprising a packed bed of unsupported nano-sized metal catalyst particles nanoparticles tended to lose catalysis efficiency over time. At high temperatures, the nanoparticles sintered with adjacent nanoparticles, reducing the overall area available for reaction on the particles' surfaces. The reduction of surface area due to temperature-induced sintering resulted in a loss of catalytic activity over time.

Experiments confirmed that sintering could be minimized and catalysis efficiency could be maintained by disposing the nano-sized metal catalyst particles on a support material, thereby dispersing or separating adjacent nanoparticles. Suitable structures for the support material include, but are not limited to, silicon nitride, silicon carbide, silicon dioxide (silica), and aluminum oxide (alumina) matrices, granules, or tubes. An example of a suitable support material is silica or alumina granules about 30 microns in diameter or $Si_3N_4$ microtubes. Another example of a suitable support material is a cordierite honeycomb. In certain embodiments, a porous material (e.g., porous granules) can be used.

In certain embodiments, the support material can further comprise promoter molecules disposed on or near the surface of the support material that contact, and in certain embodiments, are fused to the outer surface of the catalyst particles. Examples of suitable promoter molecules include, but are not limited to, aluminum, potassium, calcium, magnesium, and silicon. Promoter molecules can advantageously increase the catalytic activity of nitrogen absorption and reaction with hydrogen during ammonia synthesis by facilitating electron transfer.

In preferred embodiments, the nano-sized metal catalyst particles comprise nano-sized ferrous (iron or iron alloy) catalyst particles. Other suitable metals can include cobalt, ruthenium, and alloys thereof. Mixtures of suitable metal catalyst particles can also be used in certain embodiments. For example, certain embodiments can comprise a mixture of nano-sized iron and cobalt catalyst particles, a mixture of cobalt and ruthenium catalyst particles, a mixture of iron and ruthenium catalyst particles, or a mixture of iron, cobalt, and ruthenium catalyst particles.

As described above, in certain embodiments, at least a portion of the nano-sized catalyst particles have a metal or metal oxide core and an oxide shell. In preferred embodiments, the nano-sized ferrous catalyst particles comprise an iron or iron alloy core and an oxide shell. An oxide shell can advantageously provide means for stabilizing the metal or metal oxide core. Preferably, the oxide shell has a shell thickness between about 0.5 and 25 nm, more preferably between about 0.5 and 10 nm, and most preferably between about 0.5 and 1.5 nm. Examples of nano-sized ferrous catalyst particles comprising an oxide coating thickness between about 0.5 and 1.5 nm are shown in FIG. 2. These particles can be produced by vapor condensation in a vacuum chamber, and the oxide layer thickness can be controlled by introduction of air or oxygen into the chamber as the particles are formed.

In certain embodiments, $NO_x$ remediation systems are provided. These systems can be integrated, for example, with internal combustion engines. In at least one embodiment, a vehicle comprising an on-board $NO_x$ remediation system is provided. The $NO_x$ remediation systems disclosed herein advantageously reduce or eliminate $NO_x$ emissions from internal combustion engines by introducing ammonia or urea (which is produced by reaction of ammonia and carbon dioxide) into the exhaust stream.

An example $NO_x$ remediation system comprises a reactor as described above. $H_2$ and $N_2$ gases are passed to the reactor, which comprises a bed of supported nano-sized metal catalyst particles. As described above, $H_2$ gas can be produced by an electrolyzer system. In certain embodiments in which a $NO_x$ remediation system is onboard a vehicle, the electrolyzer is powered by the vehicle's battery and/or engine alternator. $N_2$ gas can be obtained by processing compressed air (e.g., from the brake system) through an oxygen exclusion filter. A stream of $NH_3$ is produced by the reactor.

The $NH_3$ stream is combined with exhaust from the internal combustion engine and directed into a selective catalytic reduction (SCR) catalyst and filter. Preferably, the SCR catalyst comprises supported zeolites and nano-sized metal catalyst particles such as nano-sized vanadium or vanadium alloy catalyst particles. In certain embodiments, the SCR catalyst operates at a temperature between about 200° C. and 800° C. and more preferably between about 400° C. and 600° C.

To determine how much $NH_3$ is required for $NO_x$ reduction, in certain embodiments there is provided an electronic controller that uses the engine RPM and manifold pressure along with data from a $NO_x$ sensor on the exhaust of the SCR catalyst to increase or decrease the amount of current to the electrolyzer controlling the hydrogen input to the low pressure ammonia generator. The larger the amount of ammonia generated, the greater the overall $NO_x$ reduction in the exhaust stream.

EXAMPLE 1

Synthesis of $NH_3$ was performed over a bed of nano-sized ferrous catalyst particles, manufactured using the vapor condensation process described in U.S. Pat. No. 7,282,167 to Carpenter, and supported with silicon nitride tubes. The nano-sized ferrous catalyst particles comprised an oxide coating between about 0.5 and 1.5 nanometer thickness. The particles had average diameters from 15 to 25 nanometers.

The supported nano-sized ferrous catalyst particles were piled in a packed bed configuration within a plug flow reactor system. Hydrogen and nitrogen gases were introduced into to plug flow reactor system as described above at pressures between about 10 atm and 20 atm and a temperature of about 450° C.

Ammonia was detected and alkalinity tests conducted with pH paper yielded a pH of 11, typical of ammoniacal solutions in water. The experiment established the production of ammonia from hydrogen and nitrogen at vastly reduced pressures, as compared to industrial processes for ammonia synthesis, by a factor of 15 to 30. The kinetic rate of the adsorption and disassociation of the nitrogen and hydrogen was increased by as much as three orders of magnitude.

EXAMPLE 2

Synthesis of ammonia was performed over a bed of nano-sized ferrous catalyst particles, manufactured using the vapor condensation process described in U.S. Pat. No. 7,282,167 to Carpenter, and supported on SG9801R promoted iron from BASF. The nano-sized ferrous catalyst particles comprised an oxide coating between about 0.5 and 1.5 nanometer thickness rendering them air safe for mixing. The particles had an average diameter from 15 to 30 nanometers. The nano-sized iron and iron support particles were blended for 2 minutes at 20G with an acoustic mixer to distribute the nano-sized particles onto the support iron particles.

Supported nano-sized ferrous catalyst particles were piled in a packed bed configuration within a plug flow reactor system. The supported nano-sized iron particles were reduced in a stream of hydrogen gas at 300° C. Hydrogen and nitrogen gasses were introduced into the plug flow reactor system as described above at pressures between about 5 atm and 10 atm and a temperature of 350° C. to 450° C.

Ammonia production was quantified by bubbling the mixture of gasses flowing from the reactor through a measured amount of dilute sulfuric acid containing a phenolphthalein indicator and recording the time required to reach a pink end point. The experiment established the production of ammonia from hydrogen and nitrogen at vastly reduced pressures, as compared to industrial processes for ammonia synthesis, by a factor of 15 to 30. The kinetic rate of the adsorption and disassociation of the nitrogen and hydrogen was increased by as much as three orders of magnitude compared to conventional iron catalysts.

The foregoing description is that of preferred embodiments having certain features, aspects, and advantages. Various changes and modifications also may be made to the above-described embodiments without departing from the spirit and scope of the inventions. For example, it is contemplated that nano-sized materials made from processes other than the ones described in U.S. Pat. No. 7,282,167 to Carpenter would still achieve some or all of the advantages described above or inherent herein, including cost effective ammonia synthesis. It is also contemplated that pressures well below prior art conventional processing of 200 atmospheres can be achieved using the inventive process herein.

What is claimed is:

1. A method for producing ammonia comprising:
  mixing
    a first catalyst including a millimeter-sized, granular, ferrous material and a promoter, with
    a second catalyst, distinct from the first catalyst, including discrete nano-sized ferrous catalyst particles that comprise a metallic core with an oxide shell,
  such that the discrete nano-sized ferrous catalyst particles are dispersed onto the millimeter-size, granular, ferrous material, and at least some of the nano-sized ferrous catalyst particles adjacent to other of the nano-sized ferrous catalyst particles on a grain of the millimeter-sized, granular, ferrous material are discrete and separated from each other; and
    reacting hydrogen gas ($H_2$) and nitrogen gas ($N_2$) at a high temperature within a range of about 200° C. and 600° C. in a reactor comprising the mixture of the first catalyst and the second catalyst, the dispersion further configured such that the adjacent nano-sized ferrous catalyst particles remain discrete and separated from each other on the grain of the millimeter-sized, granular, ferrous material after the production of ammonia from the hydrogen gas and the nitrogen gas at the high temperature.

2. The method of claim 1, wherein the reacting the $H_2$ gas and the $N_2$ gas comprises doing so at pressures of less than about 100 atmospheres.

3. The method of claim 1, wherein the high temperature is within the range of about 350° to 450° C.

* * * * *